United States Patent
Ripoll et al.

(10) Patent No.: US 9,166,394 B2
(45) Date of Patent: Oct. 20, 2015

(54) DEVICE AND METHOD FOR LIMITING LEAKAGE CURRENTS

(75) Inventors: Christophe Ripoll, Chevreuse (FR); Frederic Fluxa, Galluis (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/821,588

(22) PCT Filed: Aug. 2, 2011

(86) PCT No.: PCT/FR2011/051858
§ 371 (c)(1),
(2), (4) Date: Mar. 8, 2013

(87) PCT Pub. No.: WO2012/032240
PCT Pub. Date: Mar. 15, 2012

(65) Prior Publication Data
US 2013/0176650 A1 Jul. 11, 2013

(30) Foreign Application Priority Data
Sep. 8, 2010 (FR) ...................................... 10 57134

(51) Int. Cl.
| | |
|---|---|
| *H02H 9/08* | (2006.01) |
| *H02H 3/16* | (2006.01) |
| *B60L 3/00* | (2006.01) |
| *H02J 7/00* | (2006.01) |
| *H02H 3/00* | (2006.01) |

(52) U.S. Cl.
CPC .............. *H02H 3/167* (2013.01); *B60L 3/0069* (2013.01); *H02J 7/0034* (2013.01)

(58) Field of Classification Search
CPC ....... Y02T 90/12; Y02T 90/14; B60L 3/0069; B60L 1/00
USPC ....................................... 361/42, 43
See application file for complete search history.

(56) References Cited

U.S. PATENT DOCUMENTS

| | | | | |
|---|---|---|---|---|
| 5,179,490 | A | * | 1/1993 | Lawrence ........................ 361/42 |
| 5,786,971 | A | | 7/1998 | Chan et al. |
| 6,021,034 | A | | 2/2000 | Chan et al. |
| 7,317,599 | B2 | * | 1/2008 | Khoroshev et al. ............. 361/42 |
| 8,278,882 | B2 | * | 10/2012 | Gotou et al. ................... 320/163 |
| 2004/0001292 | A1 | | 1/2004 | Vanderkolk |
| 2005/0259370 | A1 | | 11/2005 | Kubo |
| 2009/0316321 | A1 | | 12/2009 | Ouwerkerk |
| 2012/0112528 | A1 | * | 5/2012 | Fassnacht ....................... 307/9.1 |
| 2013/0201582 | A1 | * | 8/2013 | Berz ................................ 361/42 |

FOREIGN PATENT DOCUMENTS

| | | |
|---|---|---|
| EP | 1 598 929 | 11/2005 |
| JP | 2005 20848 | 1/2005 |

OTHER PUBLICATIONS

International Search Report Issued Jan. 30, 2012 in PCT/FR11/51858 Filed Aug. 2, 2011.

* cited by examiner

*Primary Examiner* — Thienvu Tran
*Assistant Examiner* — Lucy Thomas
(74) *Attorney, Agent, or Firm* — Oblon, McClelland, Maier & Neustadt, L.L.P.

(57) ABSTRACT

A device including a mechanism detecting a position of a neutral of a power supply source for an electrical energy apparatus, such as a battery charger of an electric or hybrid motor vehicle, and a mechanism connecting a capacitor for limiting leakage currents between the neutral and an electrically conducting structure in which the apparatus is placed. The device can be used to limit leakage current during recharging of an electric or hybrid traction motor vehicle.

10 Claims, 3 Drawing Sheets

DEVICE AND METHOD FOR LIMITING LEAKAGE CURRENTS

The invention relates to the limiting of leakage currents of an electrical apparatus and more particularly the limiting of the leakage currents likely to occur within the chassis of an electric or hybrid motor vehicle when a battery charger is connected.

The chargers used in certain electric motor vehicles are not isolated. Each element of the charger has a common-mode capacitor relative to the chassis. On connection to an electrical power distribution network, the voltages applied to these various elements will, through these capacitors, cause leakage currents to ground.

These leakage currents to ground may, when they occur, trigger differential protections of residual current that are capable of interrupting the charging process.

If a user touches the chassis of the electric vehicle during charging, the leakage currents to ground become what are known as "touch" currents if there is a grounding fault of the vehicle. These touch currents are potentially dangerous and are limited by international standard 6 185 1-21 to 3.5 mA.

It is therefore necessary to limit these leakage currents. Accordingly, it has been proposed to use a transformer creating a galvanic isolation between the distribution network and the battery.

The transformers used are bulky elements the size of which increases with the charging power, or with the current passing through them. This solution therefore has the drawback of incurring an additional cost and an increase in the volume of the device, which greatly penalizes the electric motor vehicle.

Moreover, it is possible to connect current chargers to single-phase or three-phase networks in order to obtain a higher charging power. During a connection to a three-phase network, the stresses on the transformers used are therefore increased.

In light of the foregoing, the object of the present invention is to limit the leakage currents of an electrical apparatus.

Another object of the invention is to limit the leakage currents for several types of supply network.

According to a first aspect, a device is therefore proposed for limiting the leakage currents for an electrical apparatus, such as a battery charger installed onboard a motor vehicle with electrical or hybrid drive.

This device comprises means for detecting the position of the neutral of a source for supplying the apparatus with electrical power and means for connecting a capacitor for limiting the leakage currents between the neutral and an electrically conductive structure in which the apparatus is placed.

Thus, the capacitor placed between the neutral and the electrically conductive structure makes it possible to partly divert to neutral the leakage currents of the electrical apparatus. This solution can be applied to any type of non-isolated charger.

Advantageously, the device comprises a voltage sensor for each phase of the supply source.

Voltage sensors make it possible to determine the type of supply (single-phase, three-phase), and to detect the position of the various phases and of the neutral.

The supply source may be a three-phase or single-phase supply network.

The device may comprise three capacitors, the first electrodes of said three capacitors being connected together and to a first switch capable of connecting the three capacitors to said structure, the second electrodes of said three capacitors being respectively connected to each of the three phases of the supply source.

On connection to a three-phase supply network with no neutral, it is possible to reconstitute the neutral by connecting the three phases to the capacitors. The switch makes it possible to connect the electrically conductive structure to the neutral thus reconstituted.

Moreover, at least two phases are respectively connected to switches capable of connecting at least one of the two phases to a capacitor connected to said structure.

On connection to a single-phase supply network, these two phases are used. The switches make it possible to connect to said structure the phase on which the neutral is detected.

According to another aspect, a method is proposed for limiting leakage currents for an electrical apparatus such as a battery charger installed onboard a motor vehicle with electrical or hybrid drive.

According to a general feature of the method, the position of the neutral of a source for supplying the apparatus with electrical power is detected and a capacitor for limiting the leakage currents between the neutral and an electrically conductive structure in which the electrical apparatus is placed is connected.

Advantageously, the neutral is formed from the phases of a three-phase supply source.

The electrical apparatus is not supplied with power if the neutral has not been detected and connected to the electrically conductive structure of the electrical apparatus or if the neutral has not been formed.

Thus, the method according to the invention makes it possible to prevent at least a portion of the electrical apparatus from functioning if the limitation of the leakage currents cannot be applied.

Other advantages and features of the invention will become apparent on studying the following description, taken as a nonlimiting example and illustrated by the appended drawings in which:

FIG. 1 shows the principle of generating leakage currents known as "touch" currents in an electric vehicle to which a battery charger is connected that is not isolated galvanically.

Figure 1:
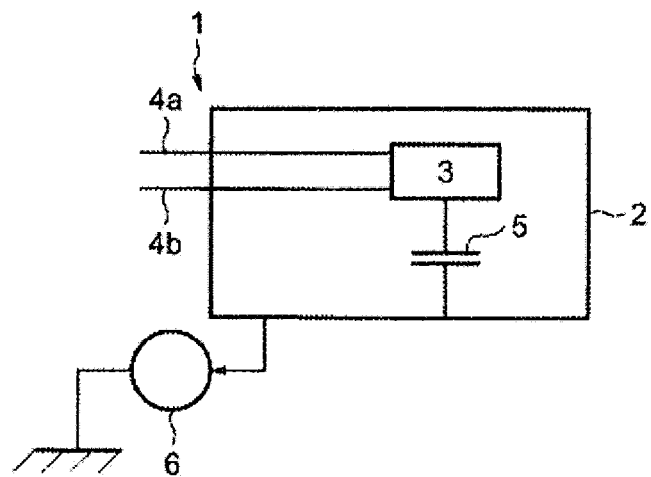
FIG. 1 illustrates the occurrence of leakage current in a battery charger of an electric motor vehicle.

It will be noted however that this principle applies to any type of apparatus, of the battery charger or other type, notably for a motor vehicle with an electric or hybrid drive train in which touch currents are likely to occur after connection of the apparatus when the bodywork of the vehicle is touched.

In this figure, reference number 1 designates the vehicle in its entirety and reference number 2 designates an electrically conductive structure of the vehicle, in this instance the bodywork of the vehicle.

As shown, the electric motor vehicle 1 is in this instance furnished with a charger 3 and also comprises an assembly of batteries and of non-isolated electric drive train.

Naturally, the vehicle 1 may also be fitted with many additional members that have not been shown in the figure for reasons of simplification.

During charging, the charger 3 is connected to the supply network by several electrical connections 4a, 4b. The electrical connection 4a may comprise several phases, and the connection 4b corresponds to the neutral.

When the charger 3 is connected to an electrical network, interference capacitors between the charger 3 and the structure 2 (symbolized by an interference capacitor 5), are sources of leakage current.

If a user 6, illustrated here by his resistive impedance, touches the structure 2, the latter is traversed by a touch current created through the interference capacitor 5.

Figure 2:
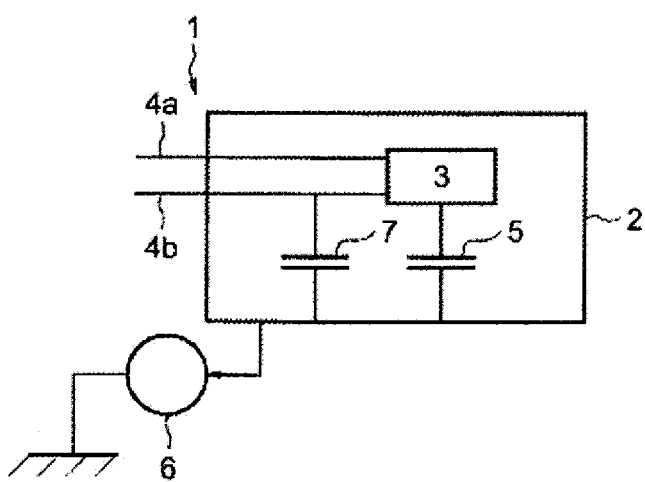
FIG. 2 shows schematically the general principle of limiting leakage current according to the invention.

FIG. 2 shows schematically the limitation of the leakage currents generated during the connection of the vehicle to a recharging terminal. As can be seen, a capacitor 7 is connected between the neutral 4b and the structure 2.

The leakage currents are thus at least partly diverted toward the neutral through the capacitor 7 so that the user 6 is protected, by being traversed by a lesser current than in the case described in FIG. 1.

Figure 3:
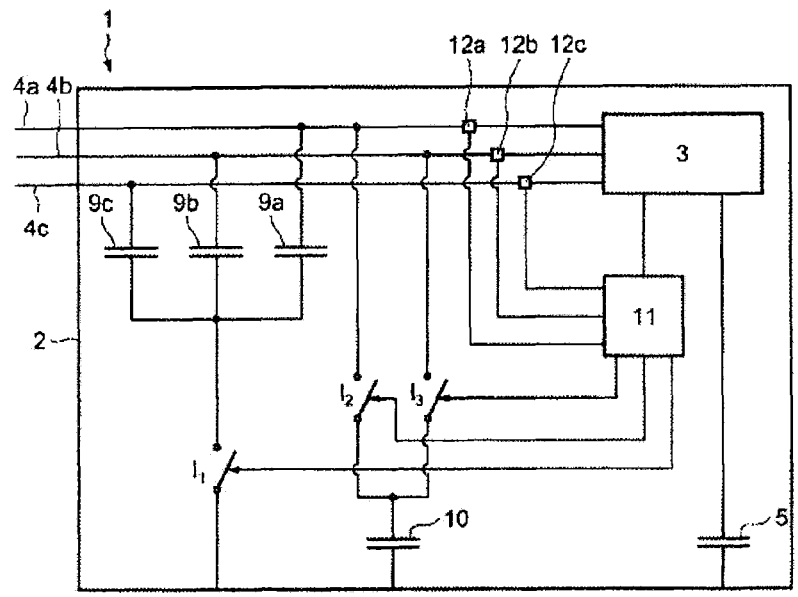
FIG. 3 illustrates one embodiment of a limiting device according to the invention.

FIG. 3, in which the architecture of a leakage current limiting device according to the invention is shown in detail, illustrates a vehicle 1 comprising three electrical connections 4a, 4b and 4c providing the connection of the vehicle to a three-phase or single-phase network.

The device 1 in this instance comprises three capacitors 9a, 9b and 9c of which the first electrodes are connected together and to a first switch $I_1$ capable of connecting the three capacitors 9a, 9b and 9c to the electrically conductive structure 2. The second electrodes of the capacitors 9a, 9b and 9c are respectively connected to each of the three electrical connections 4a, 4b and 4c.

The two electrical connections 4a and 4b are respectively connected to two switches $I_2$ and $I_3$ capable of connecting at least one of the two electrical connections 4a and 4b to a capacitor 10 connected to the structure 2.

A processing unit 11 is used to control the switches $I_1$, $I_2$ and $I_3$. This processing unit is also connected to the charger 3 and to three voltage sensors 12a, 12b and 12c.

The processing unit 11 is also connected to the charger 3.

Thus, the voltage sensors 12a, 12b and 12c make it possible to indicate the type of supply network to which the vehicle 1 has been connected, then the processing unit can actuate one of the switches $I_1$, $I_2$ or $I_3$ in order to connect, through a capacitor, the neutral to the structure.

Figure 4:
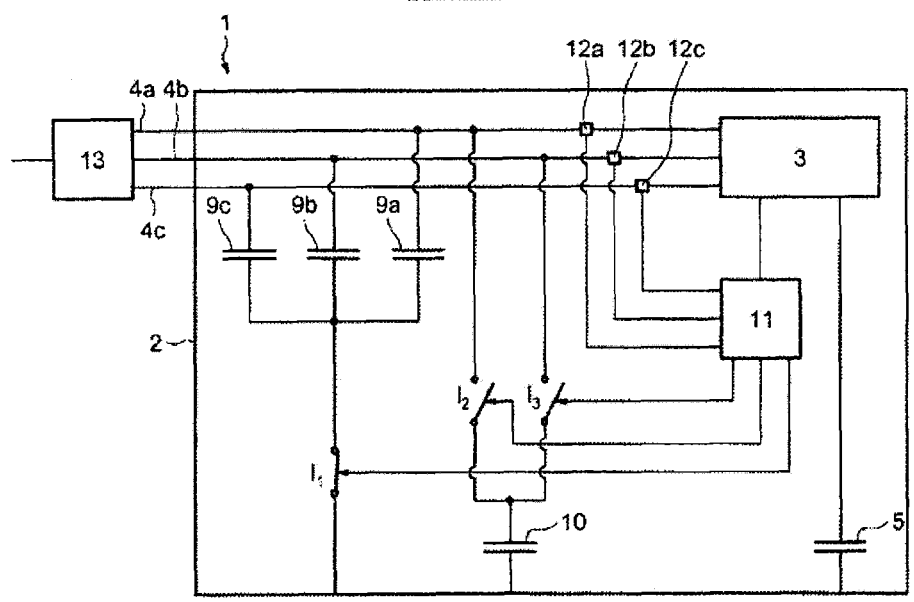
FIGS. 4, 5 and 6 illustrate the operation of the device of FIG. 3.

FIG. 4 illustrates an example of use of a device according to the invention. The vehicle 1 is in this instance connected to a three-phase supply network 13.

In a first step, the processing unit 11 prevents the charger 3 from being supplied with power.

The three electrical connections 4a, 4b and 4c respectively convey each of the phases, and the three voltage sensors 12a, 12b and 12c indicate to the processing unit 11 that the vehicle 1 is connected to a three-phase supply network.

The processing unit 11 closes the switch $I_1$ so as to reconstitute the neutral which will be connected to the structure 2 through the three capacitors 9a, 9b and 9c.

The processing unit 11 then allows the charger 3 to be supplied with power.

Figure 5:
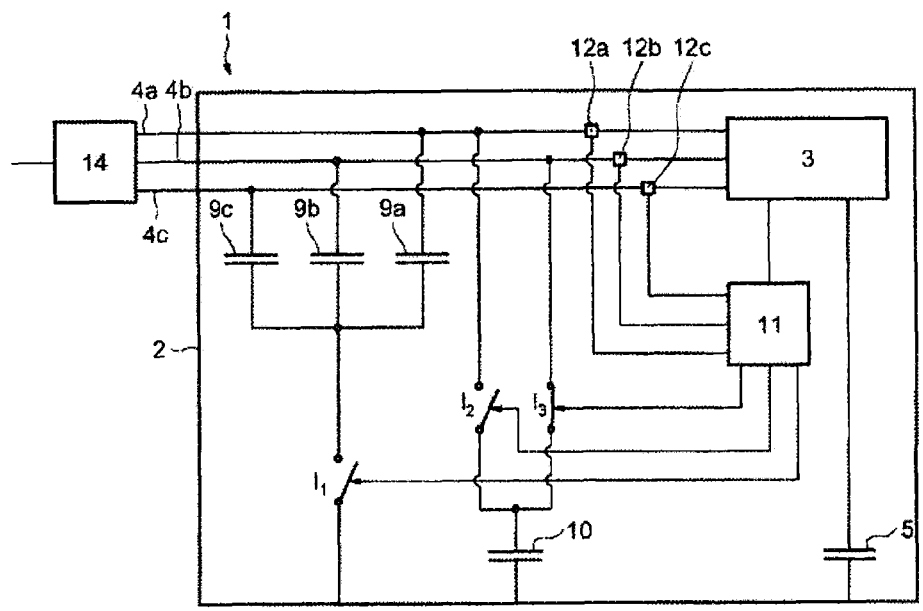

FIG. 5 illustrates another method of use of a device according to the invention in which the vehicle 1 is connected to a single-phase supply network 14.

In a first step, the processing unit 11 prevents the charger 3 from being supplied with power.

The voltage sensor 12a detects the position of the phase and the voltage sensor 12b detects the neutral.

The processing unit therefore closes the switch $I_3$ so as to connect the neutral to the structure 2 through the capacitor 10.

The processing unit 11 then allows the charger 3 to be supplied with power.

It will be noted that, on connection to a single-phase supply network, the phase can be situated on the electrical connection 4b and the neutral on the electrical connection 4a. The processing unit 11 will then close the switch $I_2$.

Figure 6:
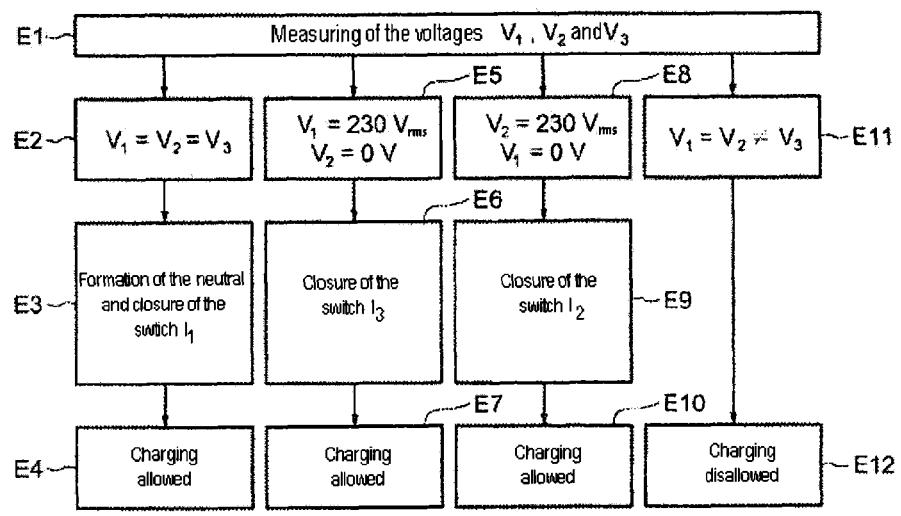

FIG. 6 gives details of the various steps used within a device for limiting leakage currents according to the various methods of use envisaged above.

These steps are in this case applied within an electric motor vehicle 1 comprising a charger 3. A step not shown here comprises the connection of the vehicle 1 to an electric supply network and the prevention of charging of the battery.

A first step E1 is implemented by means of the three sensors 12a, 12b and 12c. These sensors 12a, 12b and 12c respectively measure the voltages $V_1$, $V_2$ and $V_3$. The values measured are then supplied to the processing unit 11 where they are compared.

If the three measured voltages $V_1$, $V_2$ and $V_3$ are equal (step E2), then it is considered that the vehicle has been correctly connected to a three-phase supply network 13. The next step E3 is then implemented. It corresponds to the formation of the neutral from the three phases of the three-phase supply 13 and to the closure of the switch I. This step is also carried out by the processing unit 11. Charging is then allowed (step E4).

If the voltage $V_1$ has a root-mean-square value equal to 230V, and if the voltage $V_2$ has a zero value (step E5), then it is considered that the vehicle 1 has been correctly connected to a single-phase supply network 14, and that the electrical connection 4a conveys the phase, while the electrical connection 4b corresponds to the neutral. The switch $I_3$ is therefore closed during step E6 in order to connect the neutral to the structure 2 through the capacitor 10. The step E7 corresponds to allowing charging.

Steps E8, E9 and E10 are similar to steps E5, E6 and E7 in the situation in which the phase and the neutral are reversed.

If the voltage $V_1$ is equal to the voltage $V_2$ but differs from the voltage $V_3$ (step E11), then the vehicle is connected to a supply network in which the neutral is not determined and cannot be reconstituted. The step E12 of preventing charging is then implemented.

By virtue of the invention, the user benefits from a device that can be used in any type of electrical apparatus comprising a non-isolated electrical member. The invention allows users to be protected and a simplified use of the items of electrical apparatus of which the operation will not be interrupted due to leakages of currents to ground.

Moreover, the invention makes it possible to limit the leakage currents within items of electrical apparatus connected to single-phase or three-phase supply networks.

The invention claimed is:

1. A device for limiting leakage currents for an electrical apparatus, the device being connectable, individually, to a three-phase supply network and a single-phase supply network as a source that supplies the electrical apparatus with electrical power, the device comprising:
    circuitry including:
        a capacitor element, the capacitor element including a first capacitor and a group of capacitors comprised of second through fourth capacitors,
        first through third power supply lines,
        a first switch,
        a second switch, and
        a third switch,
    wherein first electrodes of the second through fourth capacitors are connected together and to the third switch, second electrodes of the second through fourth capacitors are respectively connected to the first through third power supply lines, two of the first through third power supply lines are respectively connected to the first and second switches, and each of the first and second switches is connected to the first capacitor, wherein the circuitry is configured to determine a position of a neutral of a source that supplies the electrical apparatus with electrical power, based on the determined position of the neutral, selectively electrically connect the capacitor element, to limit leakage currents, between a line associated with the determined neutral and an electrically conductive structure in which the electrical apparatus is placed, and identify whether the device is connected to the three-phase supply network or to the single-phase supply network, wherein, in a case that the device is identified as being connected to the three-phase supply network, the third switch is closed, and wherein, in a case that the device is identified as being connected to the single-phase supply network, one of the first and second switches is closed.

2. The device as claimed in claim 1, further comprising a voltage sensor for each phase of the source that supplies the electrical apparatus with electrical power.

3. The device as claimed in claim 1, wherein when the source that supplies the electrical apparatus with electrical power is the single-phase supply network, two lines of the first through third power supply lines are respectively connected using the first and second switches to selectively electrically connect at least one of the two lines between the capacitor element and the electrically conductive structure.

4. The device as claimed in claim 1, wherein the circuitry is configured to indicate a type of supply network of the source that supplies the electrical apparatus with electrical power, from among the three-phase supply network and the single-phase supply network.

5. The device as claimed in claim 1, wherein the capacitor element is connected to the neutral and the electrically conductive structure via a one of the first switch, the second switch, and the third switch when closed, thereby resulting in the selective electrical connection of the capacitor element between the line associated with the determined neutral and the electrically conductive structure, by the circuitry.

6. The device as claimed in claim 1, wherein the electrical apparatus is a battery charger installed onboard a motor vehicle with electrical or hybrid drive.

7. The device as claimed in claim 2, wherein the circuitry detects the position of the neutral based on output of the voltage sensor for each phase of the source that supplies the electrical apparatus with electrical power.

8. A method for limiting leakage currents for an electrical apparatus using circuitry for limiting leakage currents for the electrical apparatus the circuitry being connectable, individually, to a three-phase supply network and a single-phase supply network as a source that supplies the electrical apparatus with electrical power, the circuitry including a capacitor element having a first capacitor and a group of capacitors comprised of second through fourth capacitors, first through third power supply lines, a first switch, a second switch, and a third switch, first electrodes of the second through fourth capacitors are connected together and to the third switch, second electrodes of the second through fourth capacitors are respectively connected to the first through third power supply lines, two of the first through third power supply lines are respectively connected to the first and second switches, and each of the first and second switches is connected to the first capacitor, the method comprising:

detecting, using the circuitry, a position of a neutral of the source that supplies the electrical apparatus with electrical power;

selectively electrically connecting the capacitor element, based on said detecting the position of the neutral, to limit leakage currents, between a line associated with the detected neutral and an electrically conductive structure in which the electrical apparatus is placed;

identifying, using the circuitry, whether the three-phase supply or the single-phase supply is the source that supplies the electrical apparatus with electrical power;

closing one of the first switch and the second switch of the circuitry when said identifying identifies the single-phase supply as the source that supplies the electrical apparatus with electrical power; and closing the third switch of the circuitry when said identifying identifies the three-phase supply as the source that supplies the electrical apparatus with electrical power.

9. The method as claimed in claim 8, wherein the detected neutral is formed from phases of the three-phase supply source.

10. The method as claimed in claim 9, wherein the electrical apparatus is not supplied with power if the neutral has not been detected and connected to the electrically conductive structure of the electrical apparatus or if the neutral has not been formed.

* * * * *